March 8, 1966   H. J. KOZICKI   3,239,235
VEHICLE SUSPENSION SYSTEM
Filed Oct. 29, 1963   2 Sheets-Sheet 1
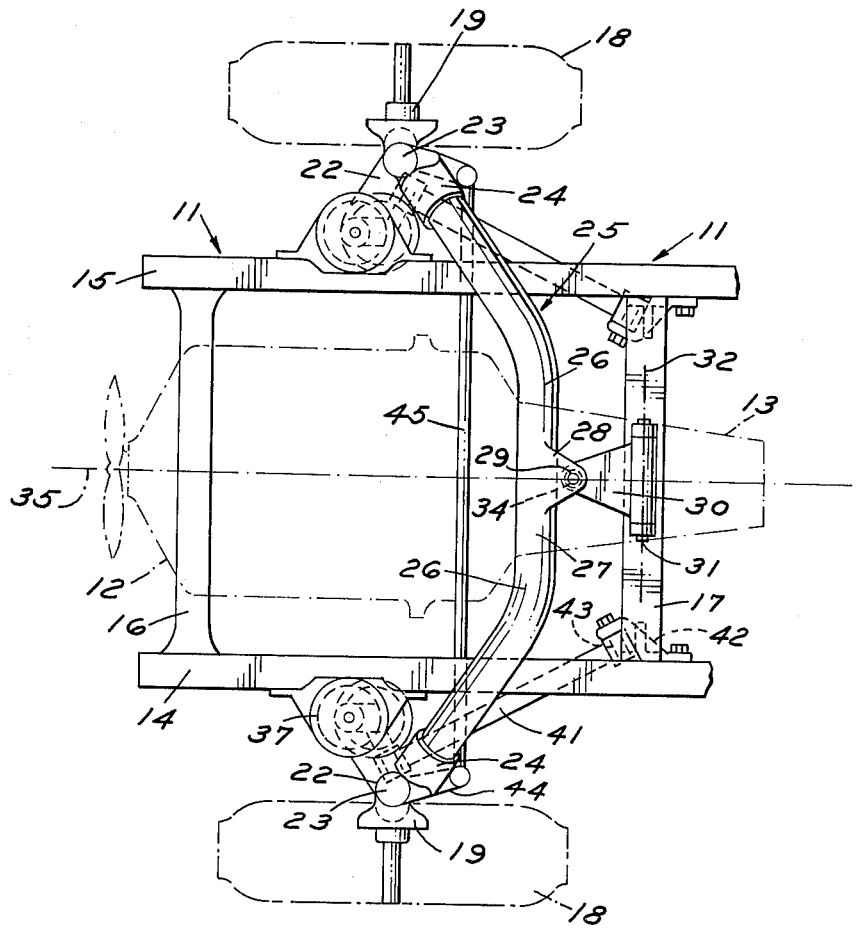
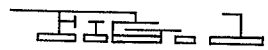
HENRY J. KOZICKI
INVENTOR.
BY John R. Faulkner
Jerry D. Beck
ATTORNEYS March 8, 1966  H. J. KOZICKI  3,239,235
VEHICLE SUSPENSION SYSTEM
Filed Oct. 29, 1963  2 Sheets-Sheet 2
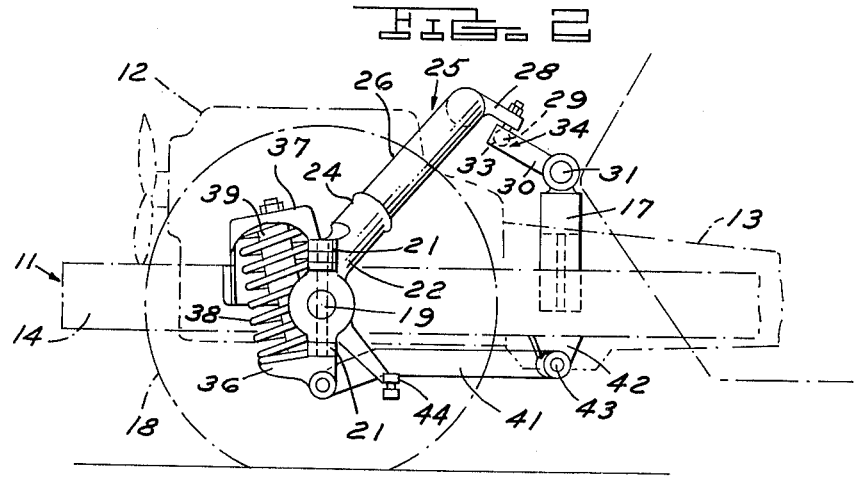
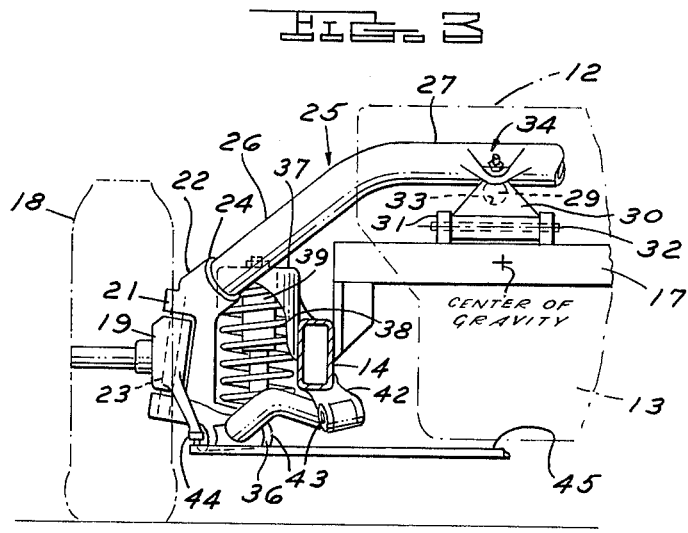
HENRY J. KOZICKI
INVENTOR.
BY John R. Faulkner
Jerry D. Beck
ATTORNEYS

3,239,235
VEHICLE SUSPENSION SYSTEM
Henry J. Kozicki, Orchard Lake, Mich., assignor to Ford Motor Company, Dearborn, Mich., a corporation of Delaware
Filed Oct. 29, 1963, Ser. No. 319,863
6 Claims. (Cl. 280—96.2)

This invention relates to a vehicle suspension system and more particularly to an improved solid axle suspension for motor vehicles.

Currently, most motor vehicles are provided with independent front suspension systems. While independent suspensions have many advantages, they are relatively expensive to manufacture and install in vehicles. Further, difficulty is frequently encountered in maintaining an independent suspension system in optimum operating condition and alignment when the vehicle is driven over rough roads. To control body roll, sway bars are provided to interconnect the two independently mounted wheels of such suspensions. Unfortunately, the utilization of sway bars effects an increase in wheel rates which is contrary to the desire of the motoring public to have a soft ride.

Solid axle front suspensions had been used extensively in passenger vehicles prior to the advent of independent front suspensions. They were low in cost and economical to maintain but had certain disadvantages inherent in their design such as undesirable wheel steering during jounce and rebound movement and wheel shimmy when the vehicle is traveling at certain critical speeds. These disadvantages eventually led to the replacement of solid axle suspensions by independent systems.

Accordingly, it is the purpose of this invention to provide a low-cost solid axle front suspension to replace present independent suspension systems but that does not possess the inherent disadvantages usually associated with suspensions of either type as presently known in the art.

In a preferred embodiment of this invention, a pair of laterally spaced front road wheels are mounted on spindle members. Yoked spindle support members are pivotally connected to the spindle members so that they are free to pivot about a vertical axis for steering purposes. This construction is commonly referred to as king pin arrangement. A solid axle is provided that has its end portions secured to each spindle support while its center portion is raised to extend in a transverse direction over the driveline of the vehicle. The center of the solid axle is universally connected by a ball and socket joint to one end of a hinge plate. The other end of the hinge plate is connected to the vehicle body so that it pivots about an axis which extends transversely of the vehicle and is longitudinally spaced rearwardly from the spindle members. Generally longitudinally extending radius arms connect each spindle support to the vehicle body.

The roll center of a vehicle provided with the solid axle of this invention is effectively raised to or even above the height of the center of gravity of the vehicle to prevent body roll when the vehicle is cornering. The theoretical roll center coincides with the ball and socket joint between the hinge plate and the center of the solid axle. Wheel rates may be substantially lowered to improve the ride of the vehicle. Instability during cornering is minimized as the wheel assemblies are rigidly interconnected by the solid axle. Harshness is substantially reduced because wheel recession is permitted by the resilient connection of the radius arm to the vehicle body. The hinge plate and the radius arms constitute upper and lower suspension arms and are arranged at an appropriate angle to provide proper antidive geometry.

One of the principal objects of this invention is to provide a solid axle suspension system for an automotive vehicle that eliminates body roll, improves maneuverability and permits reduction in wheel rates.

A further object of this invention is to provide an automotive vehicle front suspension which incorporates substantially fewer parts than in present independent suspension systems, thereby lowering its cost.

A still further object of this invention is to provide a suspension system that will require little or no adjustment in order to maintain the system at its engineered operating level.

Other objects and advantages of this invention will become more apparent from the following description when viewed in connection with the accompanying drawings, in which:

FIGURE 1 is a top plan view of a portion of a chassis of a motor vehicle incorporating the preferred embodiment of the suspension system of the present invention;

FIGURE 2 is a side elevational view of the suspension system shown in FIGURE 1; and, FIGURE 3 is a rear elevational view of one side of the suspension shown in FIGURE 1. As both sides of the suspension are identical, only one side is shown in this view.

Referring now to the drawings, FIGURE 1 discloses a portion of a vehicle frame 11 supporting an automotive engine 12 and its transmission 13 as outlined in dot and dash lines. It is to be understood that the suspension system of this invention is equally suited to vehicles of unit construction in which the frame 11 is replaced by structural members integrally formed or attached to a vehicle body.

The frame 11, on which a vehicle body can be mounted, comprises side rails 14 and 15 extending longitudinally of and for the entire length of the vehicle. A transversely extending cross member 16 connects the side rails 14 and 15 at the front of the vehicle. A second cross member 17 is elevated to pass over the transmission 13 and interconnects side rails 14 and 15 rearwardly of the engine 12.

Left and right road wheels 18 are spaced outwardly of the side rails 14 and 15 and, together with the suspension system of this invention, form the unsprung portion of the vehicle. As best seen in FIGURE 2, each wheel 18 is rotatably supported on a spindle member 19. The spindle member 19 is received within a yoke 21 of a spindle support member 22 and is pivotally connected thereto by a vertical pivot pin 23. This pivot pin 23 is sometimes referred to as a king pin.

The frame 11 forms a part of the sprung components of the vehicle as it is supported by the springs of the suspension system. The road wheels 18 and the spindle support member 22 are classified as unsprung components as the suspension springs are mounted thereon.

The upper portion of each spindle support 22 is integrally formed with a tubular socket 24 which receives the outer extremity of a solid axle 25 that extends generally transversely of the vehicle. The solid axle 25 in this preferred embodiment is a structural member of tubular construction. The outer extremities of the solid axle 25 are securely attached to the tubular socket 24 to provide a solid rigid interconnection between the two laterally spaced wheel assemblies. The solid axle 25 comprises two end portions 26 and a center portion 27. The end portions 26 extend diagonally upwardly and rearwardly from each spindle support 22 and are integrally formed with the center portion 27 that extends transversely of the vehicle. The center portion 27 is effectively raised to pass over the transmission 13 at a point even with or above the center of gravity of the vehicle as shown in FIGURE 3.

A rearwardly extending bracket 28 is rigidly connected to the center of the raised center portion 27 of the solid axle 25 and has a ball-shaped element 29 attached to the underside thereof. The apex of a triangular-shaped hinge plate 30 is provided with a socket 33 which receives the ball-shaped element 29 to form a ball and socket joint 34. This ball and socket joint 34 is preferably positioned to lie on the vehicle's longitudinal center axis designated as 35. The hinge plate 30 is pivotally connected at 31 to the elevated cross member 17 to allow for pivotal movement of the solid axle 25 about an axis 32 extending transversely of the vehicle.

The lower portion of each spindle support 22 flares out to form a lower spring seat 36. An upper cup-shaped spring seat 37 is fastened to each side rail 14 and 15 in approximate vertical alignment with the lower spring seat 36 as best seen in FIGURES 2 and 3.

Coil springs 38 are disposed between the spring seats 36 and 37 to resiliently support the sprung portion of the vehicle on the wheel assemblies. A shock absorber 39 may be installed within each coil spring 38 intermediate the spring seats 36 and 37 to provide a proper dampening effect for the vehicle. If desired, any conventional resilient means may be readily applied to supplement or replace the coil springs 38 disclosed.

A generally longitudinally extending radius arm 41 is connected to each wheel assembly. Each radius arm 41 has one end pivotally attached to the lower spring seat 36 from whence it extends in a rearward, inward and slightly upward direction. The other end of the radius arm 41 is pivotally connected to a bifurcated bracket 42 directly attached to the side rails 14 or 15 below the frame cross member 17 as best seen in FIGURE 3. To reduce harshness, compliance may be introduced by mounting the ends of the radius arm 41 in rubber bushings 43. This will permit slight resilient fore-and-aft movement of the spindle support members 22 to dampen longitudinal force components encountered by the road wheels 18.

A steering arm 44 extending from the lower end of each spindle member 19 is pivotally connected to an element 45 that forms a part of a conventional steering gear linkage.

From the foregoing description it can be readily understood that the wheel assemblies are rigidly interconnected by the solid axle 25. The theoretical roll center of the vehicle coincides with the ball and socket joint 34 lying on the longitudinal center axis 35 of the vehicle. Since the center portion 27 of the solid axle 25 is effectively raised to or above the center of gravity of the vehicle, body roll upon cornering or maneuvering the vehicle is practically eliminated. Wheel rates, therefore, can be substantially lower than in a suspension system requiring sway bars to counter body roll. Also, the solid axle 25 rigidly maintains both road wheels 18 in a generally parallel relationship to each other to improve the cornering ability of the vehicle. The camber change during roll usually associated with independent suspensions is eliminated.

During jounce and rebound movement of both wheels 18 the hinge plate 30 will tend to pivot about the transverse axis 32. Vertical movement of one wheel 18 with respect to the other wheel 18 will cause the solid axle 25 to rotate about the ball and socket joint 34. The hinge plate 30 and the radius arms 41 serve as upper and lower leading arms for the suspension system. They are angularly disposed to cause the wheel-to-ground contact points to move forwardly and upwardly during jounce. This will effect proper antidive geometry.

The utilization of the suspension system of this invention permits the automotive designer greater freedom in the design of engine accessories and supporting body structure because certain components of the suspension system, such as the conventional lower arms, are not located underneath the engine. As interference with chassis components is minimized, the oil pan configuration may be designed at the engineer's option. Also, a subframe can be readily incorporated as part of the chassis to support the engine. The reduction in component parts and the simplification of the associated frame structure effected by the installation of this novel suspension system will substantially reduce the cost of motor vehicles.

The pivotally, resiliently connected radius arms 41, which extend from the spindle support member 22 to the frame 11, improve the riding characteristics of the vehicle by reducing harshness. In addition, the radius arms 41 can be designed and positioned to assist in preventing wheel shimmy, which was frequently encountered in solid axle suspension systems used in the 1920's and 1930's.

It will be understood that the invention is not to be limited to the exact construction shown and described but that various changes and modifications may be made without departing from the spirit and scope of the invention as defined in the appended claims.

What is claimed as new is:

1. A motor vehicle having a pair of laterally spaced road wheels mounted on spindle members, a pair of spindle support members with each spindle support member being pivotally connected to each spindle member, sprung components resiliently supported on said pair of spindle support members, a rigid structural member extending generally transversely of said vehicle, said structural member being rigidly connected at its outer extremities to each spindle support member, a hinge plate having one end universally connected to a central portion of said structural member, said one end of the hinge plate being at a point even with or above the center of gravity of the motor vehicle, the other end of said hinge plate being connected to said sprung components for pivotal movement about an axis extending generally transversely of said vehicle, and a pair of radius arms, each radius arm having one end connected to each spindle support member and its other end to said sprung components.

2. A motor vehicle having a pair of laterally spaced road wheels mounted on spindle members, generally vertically extending spindle support members, each spindle support member being connected to one of said spindle members for pivotal movement of the spindle member about a steering axis, sprung components resiliently supported on said spindle support members, a solid axle extending generally transversely of said vehicle with its outer extremities being rigidly connected to each spindle support member, a radius arm extending diagonally inwardly of said vehicle, said radius arm having one end connected to one spindle support member and its other end to said sprung components of the vehicle, and a hinge plate extending generally longitudinally of said vehicle and having one end universally connected to said solid axle intermediate its outer extremities, the other end of said hinge plate being connected to said sprung components of said vehicle for pivotal movement about an axis extending generally transversely of said vehicle.

3. A motor vehicle having a pair of laterally spaced road wheels mounted on spindle members, generally vertically extending spindle support members connected to said spindle members for pivotal movement about a steering axis, sprung components resiliently supported on said spindle support members, a solid axle extending generally transversely of said vehicle with its outer extremities being rigidly connected to said spindle support members, a pair of radius arms, each radius arm having one end pivotally connected to each spindle support member and its other end to said sprung components of said vehicle, said radius arms extending generally diagonally inwardly from each spindle support member, and a hinge plate extending generally longitudinally of said vehicle and having one end universally connected to a central portion of said solid axle, said one end of the hinge plate being at a point even with or above the center of gravity of the motor vehicle, the other end of said hinge plate being connected to said sprung components of said vehicle for pivotal movement about an axis extending transversely of said vehicle and longitudinally spaced from said spindle members.

4. A motor vehicle having a vehicle body mounted on a frame, a pair of laterally spaced road wheels disposed on opposite sides of said frame, said pair of road wheels being mounted on spindle members, generally vertically extending spindle support members pivotally connected to said spindle members, a solid axle extending generally transversely of said vehicle with its outer extremities being rigidly connected to the upper portion of each spindle support member, a pair of radius arms, each radius arm having one end pivotally connected to the lower portion of each spindle support member and its other end to said frame, said radius arms extending diagonally rearwardly and inwardly from said spindle support member, spring support means between each spindle support member and said frame of the vehicle to resiliently support said vehicle body, and a hinge plate extending generally longitudinally of said vehicle and having one end universally connected to said solid axle intermediate its outer extremities, the other end of said hinge plate being connected to said frame of said vehicle for pivotal movement about an axis extending transversely of said vehicle and spaced longitudinally rearwardly from said spindle members.

5. A motor vehicle having a vehicle body supported on a frame, a pair of laterally spaced road wheels disposed on opposite sides of said frame, said road wheels mounted on spindle members, generally vertically extending spindle support members pivotally connected to said spindle members, a solid axle comprising a center portion and two end portions, the outer extremities of said end portions being rigidly connected to the upper portion of each spindle support member, said center portion of said solid axle extending transversely and rising above the center of gravity of said vehicle, a pair of radius arms, each radius arm having one end pivotally connected to the lower portion of each spindle support member and extending diagonally rearwardly and inwardly therefrom, the other end of each radius arm being pivotally connected to said frame, said radius arms being adapted to permit slight longitudinal movement of said laterally spaced road wheels, spring means resiliently supporting said frame on the lower portions of said spindle support members, and a hinge plate extending generally longitudinally of said vehicle and having one end universally connected to the center of said center portion of said solid axle, the other end of said hinge plate being connected to said frame for pivotal movement about an axis extending transversely of said vehicle and spaced longitudinally rearwardly from said spindle members.

6. A motor vehicle having a vehicle body, said vehicle body supported on a frame, a pair of laterally spaced road wheels mounted on spindle members, generally vertically extending spindle support members pivotally connected to said spindle members, a solid axle having its center portion extending generally transversely of said vehicle and integrally formed with two end portions, said center portion rising above the center of gravity of said vehicle, the outer extremity of each end portion rigidly connected to the upper portion of each spindle support member, said end portions extending inwardly, upwardly and rearwardly from each spindle support member, a pair of radius arms, each radius arm having one end resiliently pivotally connected to the lower portion of each spindle support member and extending rearwardly and inwardly therefrom, the other end of said radius arm being resiliently pivotally connected to said frame, said pivotal resilient connection resiliently countering longitudinal movement of said laterally spaced road wheels, spring seats attached to the lower portion of said spindle support member and to said frame, coil springs disposed intermediate said spring seats to resiliently support said frame on said spindle support members, and a hinge plate extending generally longitudinally of said vehicle and having a ball and socket joint at one end to universally connect said hinge plate to the center of said center portion of the solid axle, the other end of said hinge plate being connected to said vehicle body for pivotal movement about an axis extending transversely of said vehicle, said pivotal connection of the hinge plate being longitudinally rearwardly spaced from said spindle members.

References Cited by the Examiner
UNITED STATES PATENTS

| | | | |
|---|---|---|---|
| 2,138,438 | 11/1938 | Wagner | 280—124 |
| 2,692,778 | 10/1954 | Stump | 267—20 X |
| 2,753,190 | 7/1956 | Hooven | 280—124 X |
| 2,939,718 | 6/1960 | Jackman | 267—20 X |
| 2,998,265 | 8/1961 | Kozicki | 267—20 X |
| 3,001,600 | 9/1961 | MacPherson | 280—124 X |
| 3,006,429 | 10/1961 | Polhemus | 280—112 X |
| 3,073,618 | 1/1963 | Mansback | 280—96.2 |

A. HARRY LEVY, *Primary Examiner.*

KENNETH H. BETTS, MILTON BUCHLER, BENJAMIN HERSH, *Examiners.*